United States Patent Office 3,785,964
Patented Jan. 15, 1974

3,785,964
OXIDATIVE SWEETENING OF HYDROCARBON WITH NITROGEN CONTAINING COMPOUND AND WITH A CALCINED COPPER-IRON CATALYST
Sun W. Chun, Murrysville, Harry A. Hamilton, Natrona Heights, and Angelo A. Montagna, Monroeville, Pa., assignors to Gulf Research & Development Company, Pittsburgh, Pa.
No Drawing. Filed July 16, 1971, Ser. No. 163,426
Int. Cl. C10g 27/04
U.S. Cl. 208—191       8 Claims

ABSTRACT OF THE DISCLOSURE

The on-stream life in a sweetening process using a copper-iron catalyst is extended by incorporating in the feed a minor amount of a nitrogen containing compound having the formula:

where R, R' and R'' can be the same or different and are selected from hydrogen, a hydrocarbon group having from 1 to 10 carbon atoms and where optionally the hydrocarbon groups can be cyclicized to form a five or six membered heterocyclic compound. The preferred nitrogen containing compounds are ammonia and pyridine.

---

This invention relates to a method for increasing the on-stream process time in a sweetening process using a copper-iron catalyst system by incorporating into the sour hydrocarbon charge stock a minor but effective amount of certain nitrogen containing compounds.

BACKGROUND OF THE INVENTION

Thiols (mercaptans) are sulfur analogues of alcohols and contain an —SH (sulfhydril) group. Many petroleum fractions contain alkanethiols as minor constituents and these thiols impart to such fractions and their distillates an objectionable odor and corrosiveness. Distillates containing such objectionable sulfur derivatives are known as "sour" distillates, and processes for oxidizing the thiols or sulfhydril containing compounds to less objectionable disulfides are known as sweetening processes. The sweetening process is believed to be an oxidative coupling of two mercaptan molecules to give a disulfide, and thus the processes are normally run in the presence of a gas containing free molecular oxygen. The disulfides which are produced during the sweetening reaction are substantially odorless. When a sour charge stock is sweet, it passes the Doctor Test and normally has less than three parts per million of thiol sulfur. A method has now been found for increasing the on-stream process time for a sweetening process using certain copper-iron catalysts.

In accordance with the invention, an improved method for the sweetening of sour hydrocarbons substantially free of acidic type components has now been discovered, which method comprises contacting said charge stock with a catalyst comprising an intimate admixture of a copper salt and an iron salt under sweetening conditions and in the added presence of from 0.0001 to 5 weight percent based on the sour hydrocarbon of a nitrogen containing compound having the formula:

where R, R' and R'' can be the same or different and are selected from hydrogen, a hydrocarbon group having from 1 to 10 carbon atoms and where optionally the hydrocarbon groups can be cyclicized to form a five or six membered heterocyclic compound. The preferred nitrogen containing compounds are ammonia and pyridine.

Catalyst compositions have recently been discovered which have unusually good activity and long catalyst life for the conversion of compounds containing a sulfhydril group to a disulfide. These new catalyst compositions comprise a copper and a Group VIII iron group metal which may be present in the form of an intimate admixture of the salts of these metals or may be present at least in part as a spinel having the formula:

where Cu is copper and Me is a Group VIII iron group metal.

The catalyst composition can be unsupported or combined with a support material such as silica or alumina. Unsupported copper iron catalysts may be prepared in any suitable manner such as by either impregnating a dry $Fe_2O_3$ gel with a solution of a suitable copper salt, such as copper chloride, or dispersing a solution of a suitable copper salt, such as copper chloride, in a wet ferric hydroxide gel. The preferred method of preparing the unsupported catalysts is to simply thoroughly blend copper chloride and ferric oxide and pelletize under elevated pressure. By "pelletizing" is meant transformation of a finely divided solid into particles of larger size which are suitable for use as a catalyst in a fixed bed type reactor. Pelletizing may occur in a very simple manner by subjecting the finely divided salts to increased pressure while being held in a mold, or the blended salts after mulling may be extruded through a die. A lubricant may be used but is not required. Suitable molding pressures or extruding are those commonly used in the catalyst formation art. Calcination in air of this physically blended catalyst can suitably occur at temperatures of 400° F. to 800° F. A Mossbauer spectra was run on some of these copper-iron catalysts, both supported and unsupported, and the presence of the spinel $CuFe_2O_4$ was detected.

Usually the copper and iron grop metals are present as an intimate admixture of one or more salts of each of the metals. For example, the copper may be present at least in part as $CuCl_2$ intimately admixed with an iron compound or as part of a compound with an iron group metal such as the spinel $CuFe_2O_4$. The Group VIII iron group metal, known more simply as an iron group metal, oxidizes easily and is usually present as an oxide, for example, $Fe_2O_3$, or as part of a compound with Cu as above. By an "iron group metal" is meant iron, cobalt and nickel. The preferred iron group metal is iron. By an "intimate admixture" is meant an admixture prepared by chemical means, such as by coprecipitation or deposition from separate or combined solutions onto a support or an admixture prepared by the physical blending of finely divided (powdered) copper and iron group metal salts. It is believed that at least a portion of the copper and iron group metal forms a common salt such as $CuMe_2O_4$, where Me is an iron group metal.

The unsupported copper-iron catalysts may be made by impregnating dry $Fe_2O_3$ with an aqueous copper chloride solution or precipitating an iron hydroxide gel from an aqueous solution of $FeCl_3$ using $NH_3$, blending the iron hydroxide gel with aqueous $CuCl_2$ until homogeneous, followed by drying and calcining. The preferred method of preparing the unsupported catalysts is to simply thoroughly blend finely divided copper chloride and finely divided ferric oxide; pelletize under elevated pressure; and calcine. Blending is preferably done in a ball mill.

Any suitable method can be used to prepare the supported copper-iron group catalysts so long as an intimate admixture of the copper and iron group metal salts is obtained on the support. For example, sequential impregnation of copper and iron salts onto a support such as silica gel or alumina can be employed as described more fully below.

While it is not positive, it is believed the copper and iron group metals are present either in the unsupported or supported form as the metal salts and not as the free metal. By a "metal salt" is meant the metal is always present in an ionic state and not in the zero valent state. Usually the copper is present as copper chloride, copper oxide, and at least a portion as $CuMe_2O_4$ where Me is an iron group metal. The copper may also be present in any other salt form, such as $CuBr_3$, $Cu(NO_3)_2$, or $Cu(C_2H_3O_2)_2$. The iron group metal is usually present in an oxide form such as $Fe_2O_3$ and at least a portion as $CuMe_2O_4$ since the iron group metal is easily oxidized. The iron group metal may also be present in its lower or higher oxidation states or in a hydrated form. Since all of the catalysts are dried and calcined in air before use and further since the sweetening reaction is usually operated in the presence of a gas containing free molecular oxygen, such as air, the iron group metal tends to be in some oxide state even though initially it may be in the chloride, nitrate, acetate, hydroxide, etc. forms. While it is not certain, it is believed the catalysts of this invention are unique in their activity characteristics because at least a portion of the intimate admixture of the copper and iron salts becomes chemically combined to form $CuMe_2O_4$ where Me is an iron group metal. The deposition of the copper and iron group metal salts onto a support such as silica gel or alumina renders the analytical job of determining the exact nature of the manner of combination of the copper and iron salts more difficult, but the presence of the spinel $CuFe_2O_4$ has been detected by the Mossbauer spectra using the silica base catalysts.

The molar ratio of copper to iron in the catalysts of this invention is important to obtain optimum activity. The molar ratio of copper to iron can in the broad case suitably vary from 0.01:1 to 1.5:1, although in specific catalyst preparations, the preferred ratios will vary within this range.

In the case of the unsupported catalyst, the amount of the copper salt can vary from 1 to 50 percent by weight of the total catalyst and is preferably from 5 to 35 percent by weight of the total catalyst. The iron group metal salt content of the unsupported catalyst can suitably be from 50 to 99 percent by weight of the total catalyst, and is preferably 65 percent by weight to 95 percent by weight of the total catalyst.

In the case of the supported catalyst, the amount of the copper salt can generally be from 0.1 to 50 percent by weight of the catalyst, usually 0.5 to 35 percent by weight of the final catalyst, although for the preferred catalysts to be defined below the amount of copper salt is from 0.1 to 15 weight percent as defined below. The amount of the iron group metal salt can generally be from 5 to 50 percent by weight, preferably 5 to 35 percent by weight, of the total catalyst.

As will be indicated further below, the activity and stability of the copper-iron catalysts, at least for the sweetening reaction, is apparently greatly dependent on the method of preparing the catalyst and even, indeed, on the type of support and the sequential method of adding the copper and iron salts. Thus, while it is not certain as to just what it is which is conferring the catalytic properties, it is known that all of the intimate admixtures of copper and iron salts, either supported or unsupported, have surprising catalytic activity and stability albeit some have more activity and stability than others, depending on the particular method of preparation.

A preferred catalyst for use in the process of this invention is a high surface area cogelled composite comprising an iron group metal, silicon and oxygen chemically associated together in an inorganic amorphous polymer, which inorganic polymer has impregnated thereon from 0.1 to 15 weight percent of a copper salt such as copper chloride.

The inorganic polymer is prepared as follows. A dilute silica sol, preferably freshly prepared and substantially free of cationic impurities, is mixed with an aqueous solution of a compound capable of yielding iron group metal ions in solution, such as ferric chloride. By an "iron group metal" is meant iron, nickel and cobalt. Cogelation of the resulting mixture is accomplished by raising the pH with a suitable base such as ammonia. Once the cogel has set, it is washed to substantially remove any soluble salts which have formed and any residual base. To prepare this resulting cogel for catalytic use, it is dried and calcined. The copper salt is added usually by impregnation of the cogel after drying and preferably after the cogel has been calcined.

In the use of the preferred catalyst for use in the process of the instant invention, it is desirable that the silica sol be free or substantially free of cationic impurities. By "cationic impurities" are meant metallic cations, especially the alkali metals as, for example, sodium, and the alkaline earth metals, as exemplified by calcium. When such metallic cations are present in the silica sol, they cannot readily be removed at later stages of the catalyst preparation and become included in the catalyst structure. Such metallic cations may tend to inhibit the desired catalytic properties of the final product.

A number of methods are available for the preparation of a cation-free dilute silica sol. Preferably, a dilute aqueous solution of a sodium silicate, such as water glass, is flowed, as by percolation or pumping, through a bed of protonated cation-exchange material to recover an effluent dilute silica sol substantially free of cationic impurities. Any soluble silicate can be used in this method, but the sodium silicate solutions commonly known in the art as "water glass" are preferred since they are inexpensive and readily available.

The silicate solution used in preparing the cation-free silica sol is dilute, preferably containing no more than the equivalent of about five weight percent silica and preferably between one and three percent silica. Solutions more or less concentrated can be employed satisfactorily, the upper and lower limits being that concentration which will pass through the ion-exchange column without gelling and that volume of liquid which can be conveniently handled, respectively.

Any solid cation-exchange material insoluble in water can be used to prepare the protonated silica sol. Cation-exchange resins of high cation-exchange capacity such as sulfonated phenol formaldehyde resins or divinylbenzene crosslinked sulfonated polystyrene resins, like Amberlite IR-120 (manufactured by Rohm and Haas), have given excellent results in the production of dilute silica sols. In every instance the ion-exchange material must be in acid form. It can be placed in this form by washing with a suitable strong acid such as sulfuric acid or hydrochloric acid. Any residual free acid can be washed from the ion-exchange material with water.

In producing the cation-free silica sol, a single bed of cation-exchange material can be employed, or a plurality of beds arranged in series or in parallel, or both, can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above, for the initial preparation of the ion-exchange material. To determine when a bed is spent, it is convenient to measure continuously or from time to time the pH or the conductivity of the effluent silica sol. The pH of a satisfactory sol is in the neighborhood of three, and its specific conductance is in the neighborhood of $10^{-4}$ to $10^{-5}$ ohm$^{-1}$ cm.$^{-1}$. When the pH rises to above five, the processing is preferably interrupted for regeneration of the beds.

The pH of the silica sol is desirably maintained at a level less than five to prevent premature gelation of the sol. As indicated below, dilute, cation-free silica sols are unstable, tending to gel, which tendency is greatly accelerated when the pH is raised. Further, a rise in pH of the effluent silica sol indicates that the ion-exchange bed is no longer functioning efficiently in exchanging protons for cationic impurities. Maintaining the pH at less than five tends to maximize the stability of the silica sol while minimizing the concentration of cationic impurities.

Silica sols, substantially free of cationic impurities, as prepared by other methods can also be employed within the scope of this invention. For example, satisfactory dilute cation-free silica sol can be made by hydrolysis of ethylorthosilicate or of silicon tetrachloride.

"Water glass" is prepared by fusing silica with sodium carbonate, the product is a colloidal suspension of silica in sodium silicate. When this suspension of silica in sodium silicate is treated by passage through a protonated ion-exchange column, the resulting product is an aqueous colloidal suspension of silica and silicic acid having a pH of about three. This silica sol, wherein the colloidal particles of silica and silicic acid are very finely dispersed, is the starting material for this invention. The silica sol in this form is relatively stable in that it does not gel immediately, but on standing, changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles. It has also been found that thermal aging of the silica sol, for example, at temperatures from about 150° F. to 250° F., preferably 180° F. to 200° F., for at least four hours, usually 4 to 24 hours, prior to reaction of the silica sol with iron ions yields a final catalyst having large pores, i.e. a higher average pore radius.

According to the method of this invention, the freshly prepared (which includes thermal aging) silica sols, substantially free of cationic impurities, are preferably mixed promptly with the aqueous solution of the compound that yields the desired Group VIII iron group metal ion in solution. When the silica sol has been freshly prepared, the colloidal particles are very small in size and the molecular weight of the silicic acid is very low. These characteristics of the freshly prepared silica sol permit a near-atomic mixing of the elements to permit interreaction of the silicon, iron group metal and oxygen with the ultimate formation of a polymer of these elements. Furthermore, this procedure results in a final composition with an extremely high surface area, as high as about 350 m.²/g. and higher. Preferred practice is to admix the preferred iron group metal salt, i.e. an aqueous $FeCl_3$ solution to the thermally aged silica sol.

For the practice of this invention, the salt of the Group VIII iron group metal employed must be soluble in the solvent used, for example, water, an alcohol such as methyl alcohol, or other high dielectric constant materials such as dioxane, etc., in order that the iron group metal and silicon can form a cogel when the base is added. Examples of the salts of iron group metals which may be successfully employed in this invention are the nitrates, sulfates, halides, acetates, nitrites, etc., and suitable compounds of cobalt, organometallic nickel and iron.

A list of suitable salts includes, but is not limited to:

$FeCl_3$; $Fe(NO_3)_3$; $Fe(NO_3)_2$; $FeCl_2$; $Fe(NO_2)_2$; $FeBr_3$ $Fe(C_2H_3O_2)_3$; $Fe_2C_2O_4)_3 \cdot 6H_2O$; $FeOCl$; $Fe(SO_4)_3$ $FeClO_4)_3 \cdot 6H_2O$; $NiCl_2$; $NiF_2$; $Ni(NO_3)_2$ $Ni(C_2H_3O_2)_2$; $CoCl_2$; $CoF_2$; and $Co(NO_3)_2$ The most preferred iron group metal salt for use in the practice of the instant invention is ferric chloride. Ferric chloride is readily soluble in water, is inexpensive, is readily available in quantity, easily forms an insoluble gelatinous precipitate in the presence of basic substancs, such as ammonia, thereby readily permitting the desired cogelation and yields a finished catalytic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state.

When the silica sol is added to the solution of iron group metal cations, mixing should be sufficiently thorough to produce a completely homogeneous liquid. Because cation-free dilute silica sols are unstable, having a tendency to gel, it is essential for superior results, as indicated above, that the silica sol be used soon after its preparation, i.e. within 12 hours, and preferably within one hour after its preparation (which includes thermal aging) as set forth above. As indicated above, the preferred practice is to admix the thermally aged silica sol to an aqueous solution of iron group metal cations. The solution of iron group metal cations will generally contain the cations of only one of the three iron group metals; however, the solution can contain a mixture of the cations of any two or all three of the iron group metals.

Once the mixture has been thoroughly homogenized, gelation is brought about by increasing pH of the mixture. This may be done conveniently by addition of aqueous ammonia with stirring or addition of gaseous ammonia, as through a sparger. The base chosen for raising the pH of the mixture of silica sol and iron group metal cations should preferably be such as to leave no harmful residue in the resulting composition. The alkali metals and alkali metal hydroxides and such compounds therefore are not generally used for they leave a residue of alkali metal in the product difficult to remove by washing. Ammonia, on the other hand, is inexpensive, easily available, and leaves no residue upon calcination of the resulting gel. Other bases, such as trimethyl ammonium hydroxide, hydrazine or quinolinium hydroxide, can be employed, but they are expensive and are considered to have no particular advantage. When salts of nickel and cobalt and such metals are used as the source of iron group metal cations, ammonia cannot be used to adjust the pH since these metals form complex amines in admixture with ammonia. A convenient means of adjusting the pH, when salts of metals such as nickel or cobalt are used, is to add ammonium bicarbonate.

On addition of the base to the iron group metal cation-silica sol solution, a slurry is formed consisting of a gelatinous precipitate and water. Although this gelatinous precipitate can be removed at will, it is preferred to allow it to stand about 16 hours to assure complete precipitation. The precipitate can be separated from the supernatant liquid in any convenient manner as, for example, by filtration. The precipitate is then washed with water containing low levels of $NH_3$ to remove any contaminants. This washing process advantageously can be continued until conductivity measurements reach a constant level.

Once the precipitate has been washed free of contaminants, it can be dried and calcined. Preferably the washed precipitate is both dried and calcined before the addition of the copper salt, although calcining is not essential at this point but merely preferred. The washed gelatinous precipitate can be dried, for example, in a forced draft oven at a temperature in the range of from 200° F. to 300° F. over a period of from 10 to 30 hours. The dried product can then, if desired, be calcined in air at a temperature from 800° F. to 1000° F. over a period of from 10 to 20 hours, preferably at from about 850° F. to 950° F. for from about 8 to 16 hours, to form the inorganic polymer base for the catalyst of the instant invention.

The copper salt can be added to the dried and optionally calcined inorganic polymer described above by any suitable procedure. Usually the copper salt is added by impregnation from a solution of a suitable copper salt. A sufficient amount of the copper salt should be used to deposit on the finished catalyst from 0.1 to 15 weight percent, preferably from 0.5 to 7 weight percent, of the copper salt based on the total weight of the catalyst. In all cases, the salt concentrations are calculated on the basis the salts are anhydrous, i.e. without the water of hydration. Normally, an aqueous solution of the copper salt is employed, although alcoholic or other high dielectric constant mediums, such as dioxane or dimethyl sulfoxide, can be employed to form copper salt solutions. By a "high dielectric constant material" is meant one having a dielectric constant of over eight at 25° C. Suitable copper salts include copper halides, such as copper chloride, copper bromide, and copper iodide and other suitable salts such as copper nitrate, copper acetate, copper perchlorate and copper tetramine nitrate. The impregnation of the solution of the copper salt onto the inorganic polymer is usually by the method of minimum excess solution or incipient wetness, which is commonly practiced in preparing catalysts by impregnation. Other suitable impregnation techniques such as vacuum impregnation can be employed. Prior to impregnation, the calcined composite can be, of course, broken up into any convenient size, as, for example, 6 to 10 mesh.

The use of catalysts comprising silicon, oxygen and an iron group metal chemically combined to form an inorganic polymer structure are known in the art as catalysts for the sweetening of hydrocarbons. (See U.S. Pat. 3,491,020 to Norman L. Carr et al). The use of copper chloride as a hydrocarbon sweetening catalyst has been known for a much longer period of time. The teachings of Carr et al. suggest the use of various promoting agents including selenium or one of the alkali metals. Absent from the teachings of Carr et al. is any suggestion or teaching that a copper salt can be used as a promoting agent for an inorganic polymer consisting of iron, oxygen and silicon. This may be so since copper salts are not known as promoting agents but rather are sweetening catalysts in their own right. It was therefore surprising to find that the copper salts promoted the inorganic polymers described by Carr et al., and further surprising to find that the promoting effect was only achieved when relatively small amounts of the copper salts were employed. Thus the amount of copper salt to employ can be from 0.1 to 15 weight percent of the total catalyst, with preferred amounts between 0.5 and 7 percent of the total catalyst weight. Higher amounts of the copper salt result surprisingly in no promotion.

The amount of copper to employ in the preferred method of preparation should be such that the atomic ratio of copper to the iron group metal is from 0.01:1 to 0.45:1, preferably from 0.01:1 to 0.3:1.

As noted above, the very high surface area catalyst comprising a cogelled chemical composite of an iron group metal salt, oxygen and silicon is a highly effective catalyst for the selective oxidation of thiols to disulfides. The catalytic composite described with reference to iron as the iron group metal is a chemical combination comprising iron, oxygen and silicon in an amorphous, inorganic, high molecular weight polymer-like material containing multiple and random Si—O—Si, Si—O—Fe, and Fe—O—Fe linkages, with each silicon atom directly united to four oxygen atoms and each iron atom directly united to three oxygen atoms. The nature of the catalyst is such that some oxygen is readily available from within the structure for selective oxidation of adsorbed thiols. It is not known for certain whether there is a chemical interaction of the copper salt with the iron in the inorganic polymer structure but it is believed possible that some $CuFe_2O_4$ may be forming. If such is the case it is indeed surprising since the iron is already believed to be chemically combined in an amorphous structure.

Not all concentrations of the iron group metals applicable to the practice of the instant invention can be employed under the process conditions herein set forth. At metal concentrations in excess of about 60 percent by weight, the catalyst demonstrates crystalline characteristics and displays an attendant loss of desirable properties. The iron group metal and silica sol are preferably used in proportions to make the catalytic composite with an atomic ratio of iron group metal to silicon to oxygen within the range of about 1:2:5.5 to about 1:12:25.5. The most preferred catalytic composite contains an iron group metal to silicon to oxygen atomic ratio of about 1:4:9.5. In the oxidized catalytic composite there is sufficient oxygen to fully satisfy the valence requirements of both the iron group metal and the silicon. This invention contemplates the utilization of either one, two or all three iron group metals in the catalyst composite, preferably with a total iron group metal content within the specified proportions.

After the cogelled catalytic composite has been impregnated with the copper salt solution, it can then be dried in any convenient manner and for this purpose a temperature in the range of from 200° F. to 300° F. is used for a period of about 10 to 30 hours. Once the impregnated composite has been dried it can be calcined. The temperature at which the impregnated composite is calcined is suitably from 400° F. to 800° F. for a period of from 4 to 20 hours, preferably from 400° F. to 700° F. for about 16 hours.

The charge stock can be any atmospheric petroleum distillate having a boiling point from about 50° F. to 700° F. This encompasses petroleum fractions all the way from liquid petroleum gas to heavy distillate fuel oils. Usually sweetening processes are relegated to the lighter boiling charge stocks such as liquid petroleum gas, gasolines and naphthas. It is one of the advantages of the catalysts of this invention that they are useful for the sweetening of higher boiling petroleum distillates such as kerosene and heavy distillate fuel oils.

In yet another embodiment of this invention it has been found that the catalysts of this invention are unusually stable to the presence of $H_2S$ in the feed stock. Normally hydrogen sulfide is removed from the charge stock before the sweetening operation to render the life of the sweetening catalyst reasonably attractive commercially. The catalysts of this invention are so stable that sweetening can occur without prior removal of $H_2S$. It has been found that the presence of 0.06 percent $H_2S$ in a gasoline boiling range charge stock was successfully sweetened employing the catalytic composites of this invention.

The sweetening process can be run either upflow or downflow but is usually run downflow by passing the charge stock containing usually from 5 to 1000 p.p.m. alkanethiols downflow through a bed of the desired catalyst. A gas containing molecular oxygen, such as air, is normally passed concurrent to the charge stock in an amount at least stoichiometrically sufficient to react with the thiol content of the charge stock. Care must be taken not to use an excessive amount of oxygen as this tends to promote gum formation, resulting in catalyst deactivation and shorter life. The amount of oxygen in the gas containing free molecular oxygen can suitably vary from one to 100 percent, with the preferred gas obviously being air.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cycle time of the catalyst and reduces the frequency of reactivation. The oxygen concentration of the feed stock may range then, from no oxygen in the feed stock, to that naturally present, to that oxygen concentration resulting from complete saturation of the feed stock with air, or indeed in some cases the amount of air may exceed the saturation limit of the oil. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to a suitable regeneration treatment for reactivation when it becomes spent.

The catalyst does lose its activity in use, possibly as a result of a reduction in lattice oxygen within the catalyst or gum formation. It is not affected by by-product water. For this reason it is advantageous to employ multiple reactors which are alternately on stream. This permits the reactivation of one catalyst bed while the other or others continue to function. It has been found that the highest catalytic activity is achieved by a short-time activation with air at atmospheric pressure. The main purpose of reactivation is to remove gum and to replenish the oxygen in the lattice structure of the catalyst.

In a general embodiment of this invention, the sour hydrocarbon feed with or without added contact with air is heated. Usually the distillate or the mixture of distillate and air may be preheated to the reaction temperature or the mixture may be heated in the reaction vessel. Alternatively, the distillate may be optionally preheated and passed downflow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amounts of oxygen is 1.5 times that stoichiometrically required to react with the thiols, but amounts from 0.5 to 20 times the stoichiometric quantity have been used. The distillate and air are passed into the reaction vessel containing the copper catalyst under appropriate reaction conditions as set forth below.

The sweeting reaction can occur under relatively mild reaction conditions. The reaction temperature can suitably be from 0° F. to 300° F. and is preferably from 80° F. to 200° F. The higher reaction temperatures are utilized for the higher boiling charge stocks. The reaction pressure can be atmospheric to 500 p.s.i.g., preferably 25 to 100 p.s.i.g. It is preferred to maintain the reactants and products in the liquid phase to reduce the required size of the reaction vessels, but this is not essential. The space velocity is not critical and can be from 1 to 50 LVHSV (liquid volume hourly space velocity) and is preferably from one to 10.

The sweetened product together with any excess air is passed from the catalyst bed into a suitable condenser which is maintained at a temperature sufficiently low to condense any distillate vapors. The air is separated from the distillate and a noncorrosive and "doctor sweet" product is recovered.

It has now been found in accordance with the invention that the on-stream process time can be increased by adding to the sour hydrocarbon charge stock from 0.0001 to 5 weight percent based on said sour hydrocarbon charge, preferably from 0.001 to 1 weight percent, of a nitrogen containing compound having the formula:

where R, R′ and R″ can be the same or different and are selected from hydrogen, a hydrocarbon group having from 1 to 10 carbon atoms and where optionally the hydrocarbon groups can be cyclized to form a five or six membered heterocyclic compound. The term "hydrocarbon group" is also meant to include substituted hydrocarbon groups where the substituents are selected from the class consisting of chlorine and bromine. Preferably the hydrocarbon groups consist solely of carbon and hydrogen and contain from 1 to 4 carbon atoms.

Examples of suitable nitrogen containing compounds which can be used in the process of this invention include but are not limited to:

ammonia;
ethylamine;
hexylamine;
diethylamine;
dioctylamine;
diethyloctylamine;
aniline;
methylamine;
propylamine;
decylamine;
ethylpropylamine;
triethylamine;
pyridine;
methylaniline;
chloroaniline;
tribromoaniline; and
diphenylamine The nitrogen containing compounds are soluble in the sour hydrocarbon charge stocks in the concentration range desired, and, thus may suitably be added by injection means just prior to entry of the sour charge stock to the sweetening reactor or may be added to the sour charge stock at any time prior to entry of the charge stock to the reactor. It may also be desirable to add the nitrogen containing compounds at various points along the reactor.

It is also understood that the charge stocks to be treated by the method of this invention are substantially free of acidic type components such as $H_2S$ as the presence of such components interferes with the desired action of the nitrogen containing compounds which are basic in nature. By "substantially free" of $H_2S$ is meant a concentration of $H_2S$ of less than about 20 p.p.m. The acidic type components are reduced to as low a level as possible before the amines are added. The acidic type components can suitably be removed, if they are present, by caustic scrubbing.

The sweetening reaction has two objectionable side reactions or effects, namely the formation of gum on the surface of the catalyst which eventually deactivates the catalyst and the formation of peroxides which are undesirable. While it is not certain, it is believed that the defined amines which are added to the charge stock function as reducing agents to extend the useful catalyst life by retarding or preventing gum formation.

The invention will be further described with reference to the following experimental work.

In the following experiments, the charge stock was a sour heavy distillate hydrocarbon whose properties are given in Table I below.

TABLE I.—HEAVY DISTILLATE FUEL OIL INSPECTIONS

| Inspection: | Heavy distillate fuel oil |
|---|---|
| Gravity: ° API | 40.4 |
| Viscosity, SUV, 100° F. | 37.3 |
| Flash, P-M: ° F. | 194 |
| Pour Point, ° F. | +15 |
| Color, ASTM D1500 | 0.5 |
| Total sulfur, weight percent | 0.12 |
| Mercaptan sulfur: p.p.m. | 394 |
| Total acid number, ASTM D-974 | 0.01 |
| Aniline point, ° F. | 175 |
| Distillation, ASTM D-86: | |
| Overpoint, ° F. | 428 |
| Endpoint, ° F. | 626 |
| 10% at, ° F. | 500 |
| 50% at, ° F. | 550 |
| 90% at, ° F. | 592 |

The catalyst employed was prepared as follows:

(1) 2610 grams of sodium silicate solution (28.7 percent $SiO_2$) were admixed with 30 liters of $H_2O$ and passed through a bed of 3000 grams of a protonated ion-exchange resin to produce a silica sol (pH 3 to 3.5);

(2) The resin was washed with five liters of $H_2O$ and the washings were added to the silica sol;

(3) The silica sol was thermally aged at 180° F. to 200° F. for 20 hours in order to produce a final gel with a high average pore radius;

(4) 842 grams of $FeCl_3 \cdot 6H_2O$ were dissolved in five liters of water and added to the silicic acid solution;

(5) To the resulting mixture was added with constant mixing, in a flow stream, dilute aqueous ammonia (about 9% $NH_3$) in an amount sufficient to raise the pH of the resulting mixture to 8;

(6) The slurry was let stand overnight and then filtered and the filter cake was washed with water containing 0.0003% $NH_3$. Washing of the filter cake was stopped when conductivity measurements fell to a constant level; and (7) The filter cake was oven dried for 16 hours at 250° F. and then calcined at 900° F. for 16 hours in air.

The catalyst analyzed about 25 percent $Fe_2O_3$ and about 75 percent $SiO_2$. To this dried and calcined composite was added by the method of incipient wetness enough $CuCl_2 \cdot 2H_2O$ from an aqueous solution to deposit the equivalent of 4 percent anhydrous $CuCl_2$. The impregnated catalyst was dried at 250° F. for 16 hours and then calcined in air at 600° F. for 16 hours. The sweetening reaction was run upflow through a bed of the catalyst at 150° F., 50 p.s.i.g., a 9 liquid hourly space velocity using 65 standard cubic feet of air per barrel of charge stock. A lower air rate could not conveniently be maintained in the apparatus employed.

A series of runs was made using an increasing concentration of pyridine. The results are shown on Table II below.

TABLE II.—SWEETENING OF HEAVY DISTILLATE USING A 4% $CuCl_2$ ON FERRIC SILICATE CATALYST

[Conditions: 150° F.; 50 p.s.i.g.; 9 LVHSV; and 65 s.c.f./air]

| Ex. No. | Pyridine added to feed: wt percent | Sweet product throughput, vol./vol. | Product analysis, parts per million | |
|---|---|---|---|---|
| | | | Cu | Fe |
| 1 | 0 | 90 | 0.5 | 0.2 |
| 2 | 0.0003 | 126 | <0.1 | <0.1 |
| 3 | 0.003 | 180 | | |
| 4 | 0.03 | 342 | 0.3 | 0.6 |

Referring to Table II, it can be seen that increasing the pyridine concentration results in an extension of the useful life of the catalyst as shown by an increased sweet product throughput before the catalyst is required to be regenerated. It may have been expected to find large amounts of copper in the product due to the possible formation of copper amines which would wash off. Very small amounts of copper and iron were found in the product. It is believed that very small amounts of copper are found in the product despite the presence of pyridine in the feed because of the formation of a copper-iron spinel $CuFe_2O_4$.

EXAMPLE 5

Example 1 was repeated except 820 p.p.m. of $NH_3$ was added to the feed. The sweet volume throughput was 378 volumes of speed product per volume of catalyst. The copper and iron contents of the product were 1 p.p.m. and <0.1 p.p.m. respectively.

A comparison of Examples 1–5 shows various nitrogen containing compounds can be used to achieve the desired results of this invention.

Resort may be had to such variations and modifications as fall within the spirit of the invention and the scope of the appended claims.

We claim:

1. A method for the oxidative sweetening of hydrocarbon type charge stocks substantially free of $H_2S$ which comprises
    contacting said charge stock containing from 0.0001 to 5 weight percent of a nitrogen containing compound having the formula:

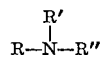

where R, R' and R'' can be the same or different and are selected from hydrogen and a hydrocarbon group having from 1 to 10 carbon atoms;
    with a solid catalyst comprising an intimate admixture of a copper salt and an iron salt under sweetening conditions in the presence of a gas containing free molecular oxygen;
wherein the catalyst is a calcined cogelled catalytic composite comprising an iron salt, silicon, oxygen and a copper salt, said composite resulting from the steps of:
    forming a solution of a substantially alkali metal-free silica sol and an iron salt;
    cogelling said solution to form a gelatinous precipitate;
    drying said gelatinous precipitate;
    impregnating said dried precipitate with an aqueous solution of a copper salt to deposit thereon from 0.1 to 15 weight percent of said copper salt;
    drying said copper containing precipitate;
    and thereafter calcining said dried precipitate, the amount of said alkali metal-free silica sol, said iron salt and said copper salt being such that the iron to silicon to oxygen atomic ratio in the final product is from about 1:2:5.5 to about 1:12:25.5, and the atomic ratio of the copper to iron is from 0.01:1 to 0.45:1.

2. A method according to claim 1 wherein the nitrogen containing compound is ammonia.

3. A method according to claim 2 wherein the nitrogen containing compound is pyridine.

4. A method according to claim 1 wherein said dried gelatinous precipitate is calcined before said impregnation with an aqueous solution of a copper salt.

5. A method according to claim 1 wherein said hydrocarbon groups in said nitrogen containing compound are connected to form a six-membered heterocyclic compound.

6. A method according to claim 4 wherein the nitrogen containing compound is ammonia.

7. A method according to claim 4 wherein said hydrocarbon groups in the nitrogen containing compound are connected to form a six-membered heterocyclic compound.

8. A method according to claim 7 wherein the nitrogen-containing compound is pyridine.

References Cited

UNITED STATES PATENTS

| 2,080,365 | 5/1937 | Von Fuchs et al. | 208—191 |
| 3,294,760 | 12/1966 | Hay | 208—191 |
| 3,303,142 | 2/1967 | Maze et al. | 208—191 |
| 2,284,271 | 5/1942 | Franklin et al. | 208—195 |
| 2,671,048 | 3/1954 | Rosenwald | 208—207 |

PAUL M. COUGHLAN, Jr., Primary Examiner

G. J. CRASANAKIS, Assistant Examiner

U.S. Cl. X.R.

208—207

UNITED STATES PATENT OFFICE
CERTIFICATE OF CORRECTION

Patent No. 3,785,964      Dated January 15, 1974

Inventor(s) Sun W. Chun et al.

It is certified that error appears in the above-identified patent and that said Letters Patent are hereby corrected as shown below:

The term of this patent subsequent to

Jan. 16, 1990, has been disclaimed.

This certificate supersedes Certificate of Correction issued Feb. 25, 1975

Signed and sealed this 20th day of May 1975.

(SEAL)
Attest:

RUTH C. MASON
Attesting Officer

C. MARSHALL DANN
Commissioner of Patents
and Trademarks